(12) United States Patent
Maus et al.

(10) Patent No.: US 11,976,184 B1
(45) Date of Patent: May 7, 2024

(54) PROCESS FOR MODIFIYNG THE MELT FLOW INDEX OF LOW DENSITY POLYETHYLENE

(71) Applicant: Basell Polyolefine GmbH, Wesseling (DE)

(72) Inventors: Andreas Maus, Frankfurt/M (DE); Timo Hees, Mainz (DE); Pascal Rebmann, Bonn (DE); Diana Doetsch, Bad Kreuznach (DE); Katharina Elsas, Mainz (DE); Harilaos Mavridis, Lebanon, OH (US); Gerhardus Meier, Frankfurt/M (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 18/083,690

(22) Filed: Dec. 19, 2022

(51) Int. Cl.
  *C08L 23/06*  (2006.01)
(52) U.S. Cl.
  CPC ........... *C08L 23/06* (2013.01); *C08L 2203/14* (2013.01); *C08L 2203/16* (2013.01); *C08L 2205/025* (2013.01); *C08L 2207/066* (2013.01)
(58) Field of Classification Search
  CPC ........... C08L 2207/066; C08L 2207/20; C08L 23/06; C08L 2205/025
  See application file for complete search history.

(56) References Cited

U.S. PATENT DOCUMENTS

| 3,691,145 A | 9/1972 | Gierth et al. |
| 5,534,472 A | 7/1996 | Winslow et al. |
| 2010/0076160 A1 | 3/2010 | Beran et al. |
| 2022/0402187 A1* | 12/2022 | Mavridis .................... C08F 8/50 |
| 2022/0402188 A1* | 12/2022 | Mavridis ................. C08L 23/12 |
| 2022/0410458 A1* | 12/2022 | Mavridis .................. C08J 11/16 |
| 2023/0023978 A1* | 1/2023 | Mavridis ................. C08L 23/10 |
| 2023/0050126 A1* | 2/2023 | Mavridis .................... C08F 8/50 |

FOREIGN PATENT DOCUMENTS

| EP | 3235833 A1 | 10/2017 |
| WO | 0136495 A1 | 5/2001 |
| WO | 2013025822 A1 | 2/2013 |

OTHER PUBLICATIONS

International Search Report and The Written Opinion for PCT/EP2023/085785 mailed Mar. 21, 2024.

* cited by examiner

*Primary Examiner* — Mark S Kaucher

(57) ABSTRACT

A process for producing a low density polyethylene with modified melt flow index, comprising subjecting to thermal visbreaking a precursor polyethylene (I) comprising 35% by weight or more of LDPE and blending the so obtained intermediate polyethylene product (II) with an additional polyethylene (III).

13 Claims, No Drawings

PROCESS FOR MODIFIYNG THE MELT FLOW INDEX OF LOW DENSITY POLYETHYLENE

FIELD OF THE INVENTION

The present disclosure provides a process for producing a low density polyethylene with modified melt flow index, comprising a thermal visbreaking step.

The so obtained product is particularly suited for use in foamed articles and films.

BACKGROUND OF THE INVENTION

Low density polyethylene is a well-known thermoplastic with a variety of uses.

In fact, low density polyethylene, especially LDPE, which is obtained by radical polymerization of ethylene, is commonly used for many applications including films for packaging, agricultural films, shopping bags, heavy-duty shipping sacks, foamed articles, caPS and closures, tubing, pipes, automotive parts, housewares, medical applications, liners and toys.

Depending upon the specific applications, different profiles of polymer properties are required.

In particular, for foamed articles (for instance foamed articles for flexible packaging) and films, a delicate balance of molecular weight, thus of melt flow index, and melt strength is required.

However, the virgin LDPE grades (directly obtained from polymerization) available on the market do not necessarily have such balance of properties.

Moreover, a particularly advantageous source of LDPE material is presently represented by LDPE recyclate, mainly coming from differential recovery of post-consumer and/or industrial plastic waste.

Such LDPE recyclate materials, obtained by separation from waste streams and often containing significant amounts of other polyethylene components, in particular of linear low density polyethylene (LLDPE), have rather variable properties and generally require processing, like treatment with radical initiators and/or blending with virgin LDPE, to make them suited for the desired use.

Thus there is a constant need for efficient processing methods able to regulate the main and most determinant polymer properties of low density polyethylene materials in view of their final use.

Thermal visbreaking of ethylene polymers in general is known, as reported for instance in WO0136495.

It has now been found that thermal visbreaking of low density polyethylene consisting of or comprising LDPE, allows to obtain final products particularly suited for use in foamed articles and films, due to an optimal balance of melt flow index and melt strength.

Such result is achieved by properly selecting the low density polyethylene material and the extent of thermal visbreaking, as expressed by the ratios of specific polymer properties before and after visbreaking.

SUMMARY OF THE INVENTION

The present disclosure provides a process for producing a low density polyethylene with modified melt flow index, comprising:

(a) subjecting to thermal visbreaking a precursor polyethylene (I) comprising 35% by weight or more, preferably 40% by weight or more, in particular from 35% to 100% by weight, or from 40% to 100% by weight, with respect to the total weight of the precursor polyethylene (I), of LDPE, said precursor polyethylene (I) having:

1$^I$) a density from 0.910 to 0.940 g/cm$^3$, preferably from 0.915 to 0.935 g/cm$^3$, determined according to ISO 1183-1:2012 at 23° C.;

2$^I$) MIP values from 0.3 to 7 g/10 min., preferably from 0.5 to 6 g/10 min.; 3$^I$) ratio MIP/MIE from 2 to 9, preferably from 2.5 to 7, where MIP is the melt flow index at 190° C. with a load of 5 kg, and MIE is the melt flow index at 190° C. with a load of 2.16 kg, both determined according to ISO 1133-2:2011;

4$^I$) ER values from 1.8 to 8, preferably from 2 to 6; thereby obtaining an intermediate polyethylene product (II) having a MIP 2$^{II}$) value higher than MIP 2$^I$), with a MIP ratio 2$^{II}$)/2$^I$) of 1.5 or more, preferably of 3 or more, more preferably of 10 or more, the upper limit being preferably of 25 in all cases; and (b) blending the intermediate polyethylene product (II) obtained in the thermal visbreaking step (a) with additional polyethylene (III) having a density 1$^{III}$) from 0.910 to 0.940 g/cm$^3$, preferably from 0.915 to 0.935 g/cm$^3$, and a MIP 2$^{III}$) value different from MIP 2$^{II}$), with a MIP ratio 2$^{III}$)/2$^{II}$) from 0.03 to 3, preferably from 0.05 to 2 and an absolute value of the difference MIP 2$^{III}$)–MIP 2$^{II}$) of at least 5, preferably at least 8, the upper limit being preferably of 20, more preferably of 15 in all cases;

thereby obtaining a low density polyethylene product (IV) having a ratio MIE/ER from 0.2 to 2.8, preferably from 0.3 to 2.5, and:

1) a density from 0.910 to 0.940 g/cm$^3$, preferably from 0.915 to 0.935 g/cm$^3$;

2) MIP values from 3 to 20 g/10 min., preferably from 4 to 15 g/10 min., with a MIP ratio 2)/2$^I$) equal to or greater than 1.5, preferably equal to or greater than 1.8, in particular from 1.5 to 15, or from 1.5 to 10, or from 1.8 to 15, or from 1.8 to 10;

where ER is calculated from:

$$ER = (1.781 * 10^{-3}) * G'$$

at a value of G"=0.5 kPa (5,000 dyn/cm$^2$);

wherein:

G'=storage-modulus;

G"=loss-modulus;

both G' and G" being measured with dynamic oscillatory shear in a plate-plate rotational rheometer at a temperature of 190° C.

The so obtained low density polyethylene product has not only relatively high melt flow index values, but also a high melt strength, as shown in the Rheotens test by the high values of force F(max) required to tear the strand.

DETAILED DESCRIPTION OF THE INVENTION

The expression "low density polyethylene" is used herein to embrace, as alternatives, both a single ethylene polymer and a polyethylene composition, i.e. a composition comprising two or more ethylene polymers.

As shown in the examples, the thermal visbreaking has the effect of decreasing the ER value while increasing the melt flow index value, so that, by subjecting to thermal visbreaking a precursor polyethylene (I) having the ER 4$^I$) values defined above, the said MIE/ER ratio of from 0.2 to 2.8, preferably from 0.3 to 2.5, is obtained.

Particularly preferred MIE/ER ratio values are:
from 0.2 to 2.44; or
from 0.3 to 2.44; or
from 0.2 to 2.40; or
from 0.3 to 2.40; or
from 0.2 to 2.35; or
from 0.3 to 2.35.

Preferably, the resulting MIE values of the present low density polyethylene product (IV) are of 1 g/10 min. or higher, in particular from 1 to 10 or from 1 to 8 g/10 min.

Preferably the precursor polyethylene (I) comprises, in total, i.e. including the previously said LDPE, at least 70% by weight of ethylene polymers, more preferably at least 80% by weight of ethylene polymers, most preferably at least 90% by weight of ethylene polymers, the preferred upper limit being of 100% by weight of ethylene polymers in all cases. Said amounts are referred to the total weight of the precursor polyethylene (I).

As previously mentioned, the precursor polyethylene (I) can consist of or comprise a virgin LDPE or can consist of or comprise a LDPE recyclate.

The precursor polyethylene (I) can also consist of or comprise a blend of virgin LDPE and LDPE recyclate.

Preferably, the additional polyethylene (III) consists of or comprises a virgin LDPE.

The expression "virgin LDPE" means that it is a polymer which has not been subjected to any process for production of finished articles, for instance packaging films, pipes, bottles, containers, or semi-finished articles, like fibers or sheets for thermoforming.

Thus the virgin LDPE has not been subjected to post-processing, except for possible pelletization, which is still considered part of the polymer production process.

"LDPE recyclate," as used herein, means post-consumer recycled ("PCR") LDPE and/or post-industrial recycled ("PIR") LDPE. PCR LDPE recyclate is derived from an end product that has completed its life cycle as a consumer item and would otherwise be disposed of as waste (e.g., a polyethylene water bottle). PIR LDPE recyclate is derived from plastic scrap that is generated as waste from an industrial process. PCR polyolefins include polyolefins that have been collected in commercial and residential recycling programs, including flexible packaging (cast film, blown film and BOPP film), rigid packaging, blow molded bottles, and injection molded containers.

Hence, in general terms, the LDPE recyclate is a material deriving from an article manufacturing process.

Usually, through a step of separation from other polymers, such as PVC, PET or PS, two main polyolefinic fractions are obtained, namely polyethylene recyclate (including HDPE, MDPE, LDPE, and LLDPE) and polypropylene recyclate (including homopolymers, random copolymers, and heterophasic copolymers). Polyethylene recyclate can be further separated to recover a portion containing LDPE in significant amounts, in particular of 35% by weight or more, with respect to the total weight.

Preferably, the precursor polyethylene (I) has one or more of the following additional features:
MIE from 0.1 to 3 g/10 min.;
Mw from 100,000 to 350,000 g/mol.;
a Mw/Mn ratio from 3 to 20 or from 4 to 15;
wherein Mw is the weight average molecular weight and Mn is the number average molecular weight, both measured by GPC (Gel Permeation Chromatography) as explained in the examples.

Preferably, the intermediate polyethylene product (II) has at least one of the following features:
$2^{II}$) MIP values from 5 to 30;
$3^{II}$) ratio MIP/MIE from 2.5 to 8, with a MIP/MIE ratio $3^{I})/3^{II}$) equal to or greater than 1.05, in particular from 1.05 to 2;
$4^{II}$) ER values from 1 to 5, with a ER ratio $4^{I})/4^{II}$) equal to or greater than 1.2, in particular from 1.2 to 4;
MIE from 1 to 10 g/10 min.;
Mw from 80,000 to 200,000 g/mol.;
a Mw/Mn ratio from 3 to 20, preferably from 4 to 15.

Preferably, the additional polyethylene (III) has at least one of the following features:
$2^{III}$) MIP values from 0.5 to 15;
$3^{III}$) ratio MIP/MIE from 1 to 8;
$4^{III}$) ER values from 1 to 6;
MIE from 0.1 to 5 g/10 min.;
Mw from 80,000 to 250,000 g/mol.;
a Mw/Mn ratio from 3 to 20 or from 4 to 15.

"LDPE," as used herein, means ethylene homopolymers and ethylene copolymers produced in a radical polymerization.

The polymerization is generally carried out under high pressure, as hereinafter explained in detail.

Examples of LDPE copolymers include ethylene-vinyl acetate copolymers, ethylene-vinyl alcohol copolymers, ethylene-acrylate copolymers, ethylene-methacrylate copolymers, ethylene-α-olefin copolymers and mixtures thereof.

Suitable examples of α-olefin comonomers in the LDPE copolymers include $C_3$-$C_{10}$ α-olefins, such as propylene, 1-butene, 1-hexene, 1-octene and mixtures thereof.

When present, comonomers can be present in amounts up to 15% by weight, 10% by weight or 5% by weight with respect to the total weight of the copolymer.

In general, the term "copolymer" is meant to include also polymers containing more than one kind of comonomers, such as terpolymers.

There are two basic high pressure polymerization processes for the manufacture of LDPE: autoclave and tubular.

The LDPE made by the autoclave reactor process ("autoclave LDPE") has a high concentration of long chain branches, resulting into high values of elongational hardening, and a relatively broad molecular weight distribution that make it easy to process.

The autoclave polymerization is generally carried out in the presence of radical initiating agents selected from organic peroxides.

The tubular reactor process does not necessarily require the use of organic peroxides. It can be carried out by using oxygen alone as the radical initiating agent, thus allowing to prepare a LDPE which is free from the products of chemical degradation of organic peroxides.

The said LDPE can also be prepared with a mixed process combining both autoclave and tubular reactors.

Process operating conditions can include, but are not limited to, a pressure in the range of from 70 MPa to 700 MPa, preferably from 140 to 190 MPa, and a temperature in the range of from 150° C. to 500° C., preferably from 150° C. to 320° C.

The polymerization gas can optionally comprise one or more chain transfer agents known in the art, such as propylene, propane and propionic aldehyde.

Such chain transfer agents are used to regulate the molecular weights.

The said processes and the resulting LDPE product are well known in the art. For instance, U.S. Pat. No. 3,691,145 and US patent application No. 2010/0076160 teach producing LDPE in a tubular reactor process.

Virgin LDPE polymers having the characteristics quoted above for the precursor polyethylene (I) and for the additional polyethylene (III) are known in the art. Specific examples are the polymers commercially available with the brand names Lupolen (LyondellBasell) and Petrothene (Equistar).

LDPE recyclate compositions having the characteristics quoted above for the precursor polyethylene (I) are known in the art as well. Specific examples are polyethylene compositions commercially available with the brand name Nextfilm (Suez).

The precursor polyethylene (I) and, consequently, the present low density polyethylene product (IV), can comprise one or more additional polyethylene components, selected in particular from HDPE (High Density Polyethylene, typically having a density from 0.940 to 0.965 g/cm$^3$), MDPE (Medium Density Polyethylene, typically having a density from 0.926 to 0.940 g/cm$^3$), LLDPE (Linear Low Density Polyethylene, typically having a density 0.900 to 0.939 g/cm$^3$) and mixtures thereof.

One or more of these additional components can be present in the LDPE recyclate, for instance.

Thus the present process allows to introduce significant amounts of recyclate material into virgin LDPE, when the additional polyethylene (III) consists of or comprises the virgin LDPE.

The said additional components are ethylene homopolymers and ethylene copolymers containing α-olefin monomer units (preferably in amounts up to 10% by weight) and their mixtures. Examples of the said α-olefins monomer units are those having from 3 to 8 carbon atoms, in particular propylene, 1-butene, 1-pentene, 1-hexene, 1-octene and 4-methyl-1-pentene. 1-butene and 1-hexene are preferred.

Said homopolymers and copolymers can be obtained by way of polymerization processes in the presence of coordination catalysts. Said processes and the homopolymers and copolymers obtained from them are widely described in the art.

In particular it is possible to carry out the polymerization process in the presence of a Ziegler-Natta catalyst or single site catalyst.

As is well known, a Ziegler-Natta catalyst comprises the product of the reaction of an organometallic compound of group 1, 2 or 13 of the Periodic Table of elements with a transition metal compound of groups 4 to 10 of the Periodic Table of Elements (new notation). In particular, the transition metal compound can be selected among compounds of Ti, V, Zr, Cr and Hf and is preferably supported on MgCl$_2$. Particularly preferred catalysts comprise the product of the reaction of said organometallic compound of group 1, 2 or 13 of the Periodic Table of elements, with a solid catalyst component comprising a Ti compound supported on MgCl$_2$.

Preferred organometallic compounds are the organo-Al compounds.

The single site catalysts are known in the art and are generally selected from metallocene and non-metallocene single site catalysts.

Examples of metallocene single site catalysts are zirconocenes and hafnocenes, for instance cyclopentadienyl or indenyl complexes of zirconium or hafnium, like bis (cyclopentadienyl) zirconium dichloride; bis (indenyl) zirconium dichloride or bis (indenyl) hafnium dichloride.

Examples of non-metallocene single site catalysts are iron complex compounds preferably having a tridentate ligand.

Thermal visbreaking includes a treatment of the precursor polyethylene (I) at temperature and/or mechanical shear energy sufficient to cause polymer chain scission to predominate of polymer chain branching or crosslinking.

In some embodiments, the thermal visbreaking is carried out by heating the precursor polyethylene (I) at a temperature equal to or greater than 280° C., preferably at a temperature equal to or greater than 290° C., more preferably at a temperature equal to or greater than 300° C., most preferably at a temperature equal to or greater than 310° C., the preferred upper limit being preferably of 500° C. in all cases.

In particular, the thermal visbreaking can be carried out at the following temperatures:
from 280° C. to 500° C.; or
from 290° C. to 500° C.; or
from 300° C. to 500° C.; or
from 310° C. to 500° C.; or
from 280° C. to 480° C.; or
from 290° C. to 480° C.; or
from 300° C. to 480° C.; or
from 310° C. to 480° C.; or
from 280° C. to 460° C.; or
from 290° C. to 460° C.; or
from 300° C. to 460° C.; or
from 310° C. to 460° C.

In some embodiments, thermal visbreaking is carried out in the absence of or substantially in the absence of oxygen, wherein substantial absence of oxygen means less than or equal to 1.0% by weight, less than or equal to 0.10% by weight, or less than or equal to 0.01% by weight, based on the total weight of polymer in the thermal visbreaking zone.

It is known that thermal visbreaking can be run in the conventional mixing apparatuses generally used for processing polymers in the molten state.

In particular, the intermediate polyethylene product (II) of the present disclosure can be prepared by processing the precursor polyethylene (I) in an extruder device. Suitable extruder devices are extruders or continuous mixers. These extruders or mixers can be single- or two-stage machines which melt and homogenize the low density polyethylene. Examples of extruders are pin-type extruders, planetary extruders or corotating disk processors. Other possibilities are combinations of mixers with discharge screws and/or gear pumps. Preferred extruders are screw extruders and in particular extruders constructed as twin-screw machine. Particular preference is given to twin-screw extruders and continuous mixers with discharge elements and especially to continuous mixers with counter rotating twin rotor or the extruder device comprises at least one co-rotating twin screw extruder. Machinery of this type is conventional in the plastics industry and is manufactured by, for example, Leistritz Extrusionstechnik GmbH, Nuremberg, Germany; Coperion GmbH, Stuttgart, Germany; KraussMaffei Berstorff GmbH, Hannover, Germany; The Japan Steel Works LTD., Tokyo, Japan; Farrel Corporation, Ansonia, USA; or Kobe Steel, Ltd., Kobe, Japan. Suitable extruder devices are further usually equipped with units for pelletizing the melt, such as underwater pelletizers.

As known by the technical expert, the extent of visbreaking, thus the increase of melt flow index in the thermal visbreaking step, is mainly influenced by the temperature and by the specific energy input.

In an extruder device, the specific energy input (SEI) refers to the energy input that is mechanically applied to the melt through the rotation of the screws and which correlates to the power consumption of the motor. It can be expressed in kWh/kg. The higher the temperature and/or the SEI value, the higher will be the melt flow index value resulting from the thermal visbreaking step.

Indicatively, the SEI value may range from 0.15 to 0.4 kWh/kg, preferably from 0.20 to 0.35 kWh/kg.

The blending step (b) can be carried out in an extruder device of the same kind as described before for the thermal visbreaking step (a).

The temperatures at which the blending step (b) is carried out are preferably low enough to avoid further thermal visbreaking, in particular equal to or lower than 250° C., more preferably equal to or lower than 240° C.

The lower limit of the temperature at which the blending step (b) is carried out is generally equal to or higher than the melting point of the polymer material employed in such step.

Preferably it is of 190° C., more preferably of 210° C.

The relative amounts of intermediate polyethylene product (II) and additional polyethylene (III) are determined by the respective melt flow index values and the desired melt flow index value of the low density polyethylene product (IV).

Indicatively, the following relative amounts can be selected:
 from 10% to 90% by weight of (II) and from 90% to 10% by weight of (III); or
 from 15% to 85% by weight of (II) and from 85% to 15% by weight of (III); or
 from 10% to 40% by weight of (II) and from 90% to 60% by weight of (III); or
 from 90% to 60% by weight of (II) and from 10% to 40% by weight of (III);
 all the said amounts being referred to the total weight of intermediate polyethylene product (II) and additional polyethylene (III).

In addition, one or more additives can be fed to the low density polyethylene. Feeding of these additives may occur before, during or after thermal visbreaking.

Such additives are common in the art. Suitable types of additives for preparing polyethylene compositions are, for example, antioxidants, melt stabilizers, light stabilizers, acid scavengers, lubricants, processing aids, antiblocking agents, slip agents, antistatic agents, antifogging agents, pigments or dyes, nucleating agents, flame retardants or fillers. It is common that several additives are added. The multiple additives can be different types of additives. It is however also possible that several representatives of one type of additives are added to the low density polyethylene. Additives of all these types are generally commercially available and are described, for example, in Hans Zweifel, Plastics Additives Handbook, 5th Edition, Munich, 2001.

In some embodiments, where antioxidant addition is used in conjunction with thermal visbreaking, the antioxidant is added after a substantial portion of the visbreaking reaction has taken place.

As previously said, the present low density polyethylene product (IV) is particularly suited for use in applications where a substantive melt strength is required or desirable, like in particular for preparing foamed articles (for instance foamed articles for flexible packaging) or films, in particular cast or blown films. In fact it is preferably characterized by F(max) values of 0.04 N or higher, in particular 0.04 to 2 N, measured with a Rheotens device at 190° C. with an acceleration of 2.4 mm/s$^2$.

Independently or in combination with said F(max) values, the present low density polyethylene product (IV) has preferably at least one of the following additional features:

3) ratio MIP/MIE from 1.8 to 8, preferably from 2 to 6, with a MIP/MIE ratio 3')/3) equal to or greater than 1.05, preferably equal to or greater than 1.08, in particular from 1.05 to 1.4, or from 1.05 to 1.3, or from 1.08 to 1.4, or from 1.08 to 1.3;
4) ER values from 1 to 4, preferably from 1.2 to 4, more preferably from 1.2 to 3.5, with a ER ratio 4')/4) equal to or greater than 1.2, preferably equal to or greater than 1.3, in particular from 1.2 to 3, or from 1.2 to 2.5, or from 1.3 to 3, or from 1.3 to 2.5;
 Mw from 60,000 to 180,000 g/mol.;
 a Mw/Mn ratio from 3 to 18 or from 4 to 13.

The foamed articles can be produced via a chemical blowing process or via a physical blowing process. Physically blown polyolefin foam is commonly produced with blowing agents such as isobutane, pentane and cyclopentane. In general, physically blown polyolefin foams have the advantage that they yield in a higher expansion and thus in a lower density compared to chemically blown polyolefin foams. The foams can be either uncrosslinked or crosslinked.

In some embodiments, foams comprising the present low density polyethylene have a density in the range of from 12 kg/m$^3$ to 60 kg/m$^3$. Such foams may be used in protective packaging for electronics, furniture, fruits, glass items, toys, among other things, or with any other article where cushioning protection from shock and/or vibration is desired. The foams may also be used in protective packaging for articles where insulation from heat is desired.

The films are prepared with processes well known in the art, in particular with extrusion processes.

To prepare the cast films by the extrusion process, the molten polymer material is forced through a long, thin, rectangular die. The extrudate is in the form of a film. The film is allowed to cool and then rolled up.

To prepare the blown films by the extrusion process, the molten polymer material is extruded through a circular die. The drawn extrudate is tubular, which expands by air to form tubular bubbles. The bubbles are allowed to cool and then are flattened and rolled up.

EXAMPLES

The practice and advantages of the various embodiments, compositions and methods as provided herein are disclosed below in the following examples. These Examples are illustrative only, and are not intended to limit the scope of the appended claims in any manner whatsoever.

The following analytical methods were used to characterize the polymer compositions.

Melt Flow Index

Determined according to ISO 1133-1 2012-03 at 190° C. with the specified load.

Density

Determined according to ISO 1183-1:2012 at 23° C.

Molecular Weight Distribution Determination

The determination of the means Mw and Mn and of Mw/Mn derived therefrom was carried out by high-temperature gel permeation chromatography using a method described in ISO 16014-1, -2, -4, issues of 2003. The specifics according to the mentioned ISO standards are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used.

The solvent was vacuum distilled under Nitrogen and was stabilized with 0.025% by weight of 2,6-di-tert-butyl-4-methylphenol. The flowrate used was 1 ml/min, the injection was 500 μl and polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with Hexadecane.

The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC Control V6.02.03 and NTGPC V6.4.24 (hs GmbH, Hauptstraβe 36, D-55437 Ober-Hilbersheim, Germany) respectively.

Complex Shear Viscosity $\eta_{0.02}$ (Eta (0.02)) and ER

Measured at angular frequency of 0.02 rad/s and 190° C. as follows.

Samples were melt-pressed for 4 min under 200° C. and 200 bar into plates of 1 mm thickness. Disc specimens of a diameter of 25 mm were stamped and inserted in the rheometer, which was pre-heated at 190° C. The measurement can be performed using any rotational rheometer commercially available. Here the Anton Paar MCR 300 was utilized, with a plate-plate geometry. A so-called frequency-sweep is performed (after 4 min of annealing the sample at the measurement temperature) at T=190° C., under constant strain-amplitude of 5%, measuring and analyzing the stress response of the material in the range of excitation frequencies ω from 628 to 0.02 rad/s. The standardized basic software is utilized to calculate the rheological properties, i.e. the storage-modulus, G', the loss-modulus, G", the phase lag δ(=arctan(G"/G')) and the complex viscosity, as a function of the applied frequency, namely $\eta^*(\omega)=[G'(\omega)^2+G"(\omega)^2]^{1/2}/\omega$. The value of the latter at an applied frequency ω of 0.02 rad/s is the $\eta_{0.02}$.

ER is determined by the method of R. Shroff and H. Mavridis, "New Measures of Polydispersity from Rheological Data on Polymer Melts," J. Applied Polymer Science 57 (1995) 1605 (see also U.S. Pat. No. 5,534,472 at Column 10, lines 20-30). It is calculated from:

$$ER = (1.781 * 10^{-3}) * G'$$

at a value of G"=5,000 dyn/cm².

As those skilled in the art will recognize, when the lowest G" value is greater than 5,000 dyn/cm², the determination of ER involves extrapolation. The ER values calculated then will depend on the degree on nonlinearity in the log G' versus log G" plot. The temperature, plate diameter and frequency range are selected such that, within the resolution of the rheometer, the lowest G" value is close to or less than 5,000 dyn/cm².

Comonomer Content

The comonomer content was determined by means of IR in accordance with ASTM D 6248 98, using an FT-IR spectrometer Tensor 27 from Bruker.

Melt Strength

Melt strength of a polymer is an important parameter in melt processing operations where stretching or drawing is involved at one or more stages in the process. It depends on molecular parameters like e.g. molecular weight, molecular weight distribution and/or polymer branches. The test device measures the extensional properties of polymer melts by drawing a vertical melt strand under constant force in the Rheotens spinline, which is located underneath the capillary die, at either constant pull-off speed or with a linear accelerating velocity.

Melt Strength analysis was carried out at 190° C. on a Göttfert Rheotester 1000 (12 mm Barrel diameter, Capillary die L/D=20/2), equipped with a RHEOTENS 71.97 device. The RHEOTENS consists of two upper and two lower driven, counter rotating wheels that are connected to a very sensitive balance-system. The vertical gap between the wheels was 0.3 mm. After 10 min. melting time, the polymer was extruded with a shear rate of 50 1/s. The polymer strand leaves the capillary die and the die-exit velocity $v_0$ is recorded. At a strand length of 74 mm the upper two wheels pull the melt strand downwards with an acceleration of 2.4 mm/s² and the velocity v is recorded (the lower two wheels are only for additionally stabilizing the strand during drawdown). The drawdown ratio $\lambda=v/v_0$ at break, the velocity at break, and the force at break of the melt strand (F(max)= Melt Strength) are recorded.

SEI

As those skilled in the art will know, there are different ways to calculate the specific energy input SEI. SEI can be calculated by division of the motor power by the material flow. Motor power is equal to the torque multiplied with the angular velocity. The equation for the SEI is as follows:

$$SEI = \frac{2 \cdot \pi \cdot n \cdot M_D}{\dot{m}}$$

Here, 2*π*n represents the angular velocity ω, $M_D$ stands for the torque and $\dot{m}$ represents the material flow. When the torque of the motor cannot be directly measured, SEI can also be calculated approximately according to the following equation using the maximum and the actual current of the motor.

$$SEI = P_{max} * \frac{n_{actual}}{n_{max}} * \frac{I_{actual}}{I_{max}} * \frac{\eta_{transmission}}{\dot{m}}.$$

Here, n represents the speed of the screws, I stands for the current and $\eta_{transmission}$ is the efficiency of the transmission.

Example 1

The commercial grade Lupolen® 2420D, sold by LyondellBasell Industries, was used as precursor polyethylene (I).

The commercial grade Lupolen® 2420H, sold by LyondellBasell Industries, was used as additional polyethylene (III).

Lupolen® 2420D and Lupolen® 2420H are virgin LDPE, having the properties reported in Table 1, where they are identified as "LP 2420D" and "LP 2420H" respectively.

The low density polyethylene product (IV) of Example 1 was obtained by first extruding the precursor polyethylene (I) in an extruder Leistritz ZSE 27MAXX, in process step (a).

The machine parameters were:
Rotation speed: 750 rpm;
Throughput: 20 kg/h;
Temperatures:
Zone 1: 300° C., Zone 2: 320° C., Zone 3-10: 340° C., Die: 300° C.;
SEI: 0.32 kWh/kg.

The properties of the so obtained intermediate polyethylene product (II) are reported in Table 1, wherein it is identified as "Int. (II)". The intermediate polyethylene product (II) was then blended with the additional polyethylene (III), in process step (b). The relative amounts in the blend were 20% by weight of intermediate polyethylene product (II) and 80% by weight of additional polyethylene (III).

The process step (b) took place in the same extruder Leistritz ZSE 27MAXX as in step (a).

The machine parameters were:
Rotation speed: 200 rpm;
Throughput: 30 kg/h;
Temperatures:
Zone 1: 200° C., Zone 2: 220° C., Zone 3-10: 240° C., Die: 220° C.;
SEI: 0.08 kWh/kg.

The properties of the so obtained low density polyethylene product (IV) are reported in Table 1, wherein it is identified as "Prod. (IV)".

TABLE 1

|  | LP 2420D | LP 2420H | Int. (II) | Prod. (IV) |
|---|---|---|---|---|
| MIP [g/10 min] | 1.12 | 7.74 | 19.9 | 8.39 |
| MIE [g/10 min] | 0.25 | 1.93 | 5.41 | 2.09 |
| Density [g/cm³] | 0.922 | 0.922 | 0.924 | 0.922 |
| Mw [g/mol] | 153196 | 109464 | 103233 | 112930 |
| Mw/Mn | 13.6 | 7.1 | 8.4 | 10.0 |
| MIP/MIE | 4.5 | 4.0 | 3.7 | 4.0 |
| ER | 4.0 | 1.9 | 2.2 | 1.9 |
| MIE/ER | 0.06 | 1.02 | 2.48 | 1.09 |
| F(max) [N] | 0.138 | 0.088 | 0.043 | 0.086 |

The data reported in Table 1 show that the present process allows to incorporate significant amounts of visbroken LP 2420D (Int. (II)) into LP 2420H, without substantially altering the properties of LP 2420H.

It would be therefore possible to add into LP 2420H a visboken recyclate, in place of the proxy intermediate polyethylene product (II) obtained by visbreaking LP 2420D, still maintaining satisfactory properties.

Example 2

The commercial grade Lupolen® 2420D, sold by LyodellBasell Industries, was used both as precursor polyethylene (I) and as additional polyethylene (III).

The low density polyethylene product (IV) of Example 2 was obtained by first extruding the precursor polyethylene (I) in an extruder Leistritz ZSE 27MAXX, in process step (a).

The machine parameters were:
Rotation speed: 700 rpm;
Throughput: 30 kg/h;
Temperatures:
Zone 1: 300° C., Zone 2: 320° C., Zone 3-10: 340° C., Die: 300° C.;
SEI: 0.27 kWh/kg.

The properties of the so obtained intermediate polyethylene product (II) are reported in Table 2, wherein it is identified as "Int. (II)". The intermediate polyethylene product (II) was then blended with the additional polyethylene (III), in process step (b). The relative amounts in the blend were 85% by weight of intermediate polyethylene product (II) and 15% by weight of additional polyethylene (III).

The process step (b) took place in the same extruder Leistritz ZSE 27MAXX as in step (a).

The machine parameters were:
Rotation speed: 200 rpm;
Throughput: 30 kg/h;
Temperatures:
Zone 1: 200° C., Zone 2: 220° C., Zone 3-10: 240° C., Die: 220° C.;
SEI: 0.08 kWh/kg.

The properties of the so obtained low density polyethylene product (IV) are reported in Table 2, wherein it is identified as "Prod. (IV)".

TABLE 2

|  | Int. (II) | Prod. (IV) |
|---|---|---|
| MIP [g/10 min] | 11.5 | 6.57 |
| MIE [g/10 min] | 3.06 | 1.65 |
| Density [g/cm³] | 0.922 | 0.923 |
| Mw [g/mol] | 117280 | 133918 |
| Mw/Mn | 9.2 | 8.9 |
| MIP/MIE | 3.76 | 3.98 |
| ER | 2.41 | 2.63 |
| MIE/ER | 1.27 | 0.63 |
| F(max) [N] | 0.081 | 0.1516 |

The data reported in Table 2 show that the present process allows to obtain substantially the same melt flow index value as for LP 2420H, with an even improved melt strength, as demonstrated by the higher F(max) value.

What is claimed is:

1. A process for producing a low density polyethylene with modified melt flow index, comprising:
   (a) subjecting to thermal visbreaking a precursor polyethylene (I) comprising 35% by weight or more, with respect to the total weight of the precursor polyethylene (I), of LDPE, said precursor polyethylene (I) having:
   $1^I$) a density from 0.910 to 0.940 g/cm³, determined according to ISO 1183-1:2012 at 23° C.;
   $2^I$) MIP values from 0.3 to 7 g/10 min.;
   $3^I$) ratio MIP/MIE from 2 to 9, where MIP is the melt flow index at 190° C. with a load of 5 kg, and MIE is the melt flow index at 190° C. with a load of 2.16 kg, both determined according to ISO 1133-2:2011;
   $4^I$) ER values from 1.8 to 8;
   thereby obtaining an intermediate polyethylene product (II) having a MIP $2^{II}$) value higher than MIP $2^I$), with a MIP ratio $2^{II})/2^I$) of 1.5 or more; and
   (b) blending the intermediate polyethylene product (II) obtained in the thermal visbreaking step (a) with additional polyethylene (III) having a density $1^{III}$) from 0.910 to 0.940 g/cm³, and a MIP $2^{III}$) value different from MIP $2^{II}$), with a MIP ratio $2^{III})/2^{II}$) from 0.03 to 3, and an absolute value of the difference MIP $2^{III}$) MIP $2^{II}$) of at least 5;
   thereby obtaining a low density polyethylene product (IV) having a ratio MIE/ER from 0.2 to 2.8, and:
   1) A density from 0.910 to 0.940 g/cm³;
   2) MIP values from 3 to 20 g/10 min;
   where ER is calculated from:

$$ER = (1.781 \times 10^{-3}) \times G'$$

at a value of G″=0.5 kPa (5,000 dyn/cm²);

wherein:

G'=storage-modulus;

G"=loss-modulus;

both G' and G" being measured with dynamic oscillatory shear in a plate-plate rotational rheometer at a temperature of 190° C.

2. The process of claim 1, wherein the thermal visbreaking step (a) is carried out by heating the precursor polyethylene (I) at a temperature equal to or greater than 280° C.

3. The process of claim 1, wherein the thermal visbreaking step (a) is carried out in an extruder device.

4. The process of claim 1, wherein the precursor polyethylene (I) has at least one of the following additional features:

MIE from 0.1 to 3 g/10 min.;

Mw from 100,000 to 350,000 g/mol.;

a Mw/Mn ratio from 3 to 20 or from 4 to 15;

wherein Mw is the weight average molecular weight and Mn is the number average molecular weight, both measured by GPC (Gel Permeation Chromatography).

5. The process of claim 1, wherein the precursor polyethylene (I) comprises a virgin LDPE, or a LDPE recyclate, or a blend of virgin LDPE and LDPE recyclate.

6. The process of claim 1, wherein the precursor polyethylene (I) comprises one or more additional polyethylene components selected from HDPE, MDPE, LLDPE and mixtures thereof.

7. The process of claim 1, wherein the additional polyethylene (III) comprises a virgin LDPE.

8. The process of claim 1, wherein the relative amounts of intermediate polyethylene product (II) and additional polyethylene (III) are:

from 10% to 90% by weight of (II) and from 90% to 10% by weight of (III); or from 15% to 85% by weight of (II) and from 85% to 15% by weight of (III); or from 10% to 40% by weight of (II) and from 90% to 60% by weight of (III); or from 90% to 60% by weight of (II) and from 10% to 40% by weight of (III);

all the said amounts being referred to the total weight of intermediate polyethylene product (II) and additional polyethylene (III).

9. The process of claim 1, wherein the low density polyethylene product (IV) has a MIE of 1 g/10 min. or higher.

10. The process of claim 1, wherein the low density polyethylene product (IV) has at least one of the following additional features:

3) Ratio MIP/MIE from 1.8 to 8, with a MIP/MIE ratio $3^r)/3)$ equal to or greater than 1.05;

4) ER values from 1 to 4, with a ER ratio $4^r)/4)$ equal to or greater than 1.2;

Mw from 60,000 to 180,000 g/mol.;

a Mw/Mn ratio from 3 to 18;

F(max) values of 0.04 N or higher, measured with a Rheotens device at 190° C. with an acceleration of 2.4 mm/s².

11. The low density polyethylene obtainable by the process of claim 1.

12. A manufactured article comprising the low density polyethylene of claim 11.

13. The manufactured article of claim 12, in form of a foamed article or a film.

* * * * *